Feb. 10, 1970 R. C. CASANOV 3,494,393
SCREW POSITIONING DEVICE
Filed Dec. 18, 1967
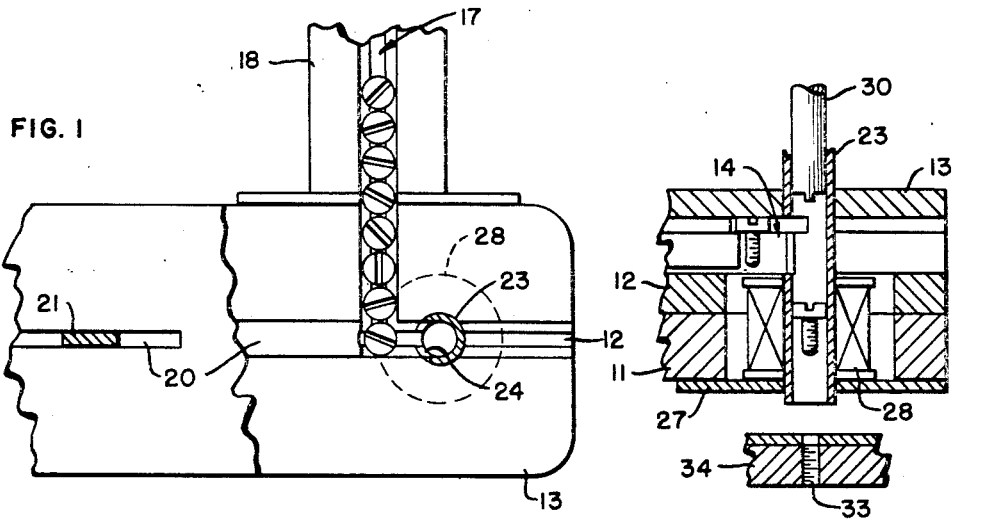
FIG. 1
FIG. 3
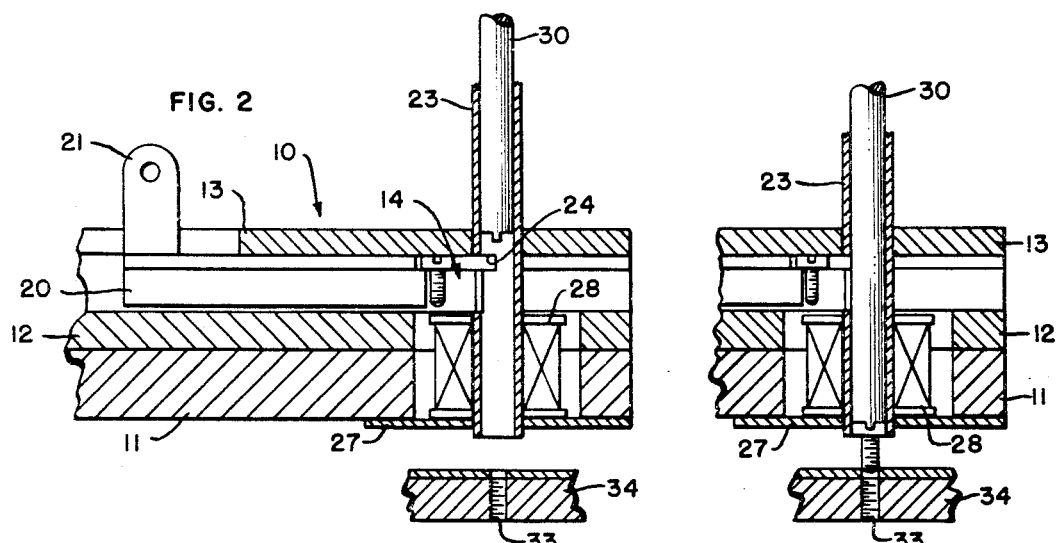
FIG. 2
FIG. 4
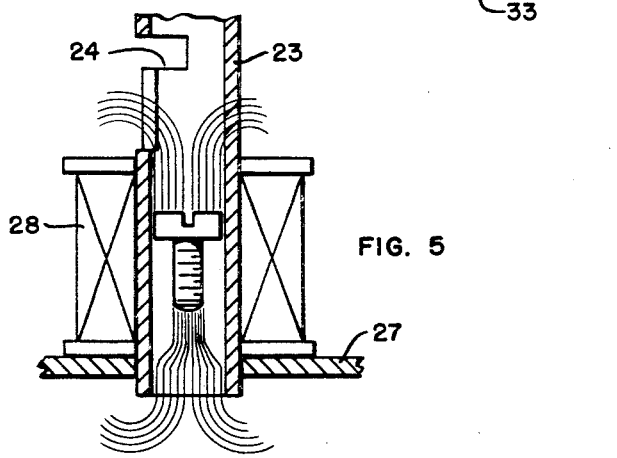
FIG. 5
INVENTOR
RAYMOND C. CASANOV
BY R. C. Terry
ATTORNEY

United States Patent Office 3,494,393
Patented Feb. 10, 1970

3,494,393
SCREW POSITIONING DEVICE
Raymond C. Casanov, Chicago, Ill., assignor to Teletype Corporation, Skokie, Ill., a corporation of Delaware
Filed Dec. 18, 1967, Ser. No. 691,432
Int. Cl. B25b 23/12
U.S. Cl. 144—32                    6 Claims

ABSTRACT OF THE DISCLOSURE

A device for supporting steel screws in the path of a tool steel screwdriver comprising a brass guide tube having an inside diameter slightly larger than the outside diameter of the screws, means for inserting the screws individually into the tube, a coil of copper wire positioned around the tube and a source of alternating current for energizing the coil and thereby producing an alternating magnetic field of sufficient strength to support the screws in the tube.

Background of the invention

In the past devices for supporting screws for engagement by the blades of automatic screwdrivers have usually included pairs of fingers which grip individual screws and support them in the path of travel of a blade. Such devices are quite complex in design and therefore expensive to manufacture and are unreliable in operation due to wear, misalignment of parts, etc. Accordingly, there exists a need for a simple, low cost device for supporting screws for engagement by screwdriver blades which is reliable in operation.

Summary of the invention

In accordance with the preferred embodiment of the invention an article support device of simple design which is economical to manufacture and highly reliable in operation is comprised of a hollow member formed from a nonmagnetic material and having an axis, means for inserting an article formed from a magnetic material into the hollow member and means for generating an alternating magnetic field having an axis extending parallel to the axis of the hollow member within the center of the hollow member thereby supporting the object therein.

Description of the drawing

A more complete understanding of the invention may be had by referring to the following detailed description when taken in conjunction with the drawing wherein:

FIGURE 1 is a top view of a portion of an automatic screwdriving machine having a screw positioning device constructed in accordance with the invention in which certain parts have been broken away more clearly to illustrate certain features of the invention;

FIGURE 2 is a sectional view of the device shown in FIGURE 1 showing the automatic screwdriving machine at a first stage of its operation;

FIGURE 3 is a view similar to FIGURE 2 showing the device at a later stage;

FIGURE 4 is a view similar to FIGURE 3 showing the device at a still later stage, and FIGURE 5 is an enlarged view similar to FIGURE 3.

Detailed description

Referring now to the drawing, wherein like reference numerals designate like parts throughout the several views, with particular reference being had to FIGURES 1 and 2, there is shown a portion of an automatic screwdriving machine 10. The device is comprised of a frame member 11 having a pair of guide blocks 12 and 13 positioned on it. The guide blocks 12 and 13 are suitably cutaway adjacent their point of connection to form a T-shaped slot 14 which extends completely across the device from left to right (FIGURES 1 and 2). As is best shown in FIGURE 1, the blocks 12 and 13 also have a second T-shaped slot 17 formed in them which extends from the slot 14 at right angles with respect thereto through the blocks 12 and 13 and through a guide member 18 that is suitably attached to the blocks 12 and 13. Steel screws such as the screws shown in the drawing are fed into the T-shaped slot 17 by a "Syntron" feeder or other similar device in such a manner that a plurality of screws are always positioned adjacent the intersection of the slots 17 and 14 in the manner shown in FIGURE 1.

Positioned within the T-shaped slot 14 is a T-shaped pusher member 20 which is suitably dimensioned to permit the pusher member 20 to slide easily within the T-shaped slot 14. A drive member 21 is attached to the pusher member 20 and may be used to form a drive connection between the pusher member 20 and suitable means (not shown) for reciprocating the member 20 back and forth within the slot 14.

A guide tube 23 formed from brass or a similar nonmagnetic material is mounted in the block 13 and extends through the T-shaped slot 14 and through enlarged openings in the block 12 and the frame member 11. The tube 23 has a suitably shaped slot 24 formed in its side wall which permits the pusher member 20 to move screws through the T-shaped slot 14 from the T-shaped slot 17 into the tube 23. As is best shown in FIGURE 5, the inside diameter of the tube 23 is only slightly larger than the outside diameter of the screws so that the tube 23 serves to guide and to maintain the alignment of the heads of the screws.

A support plate 27 is fastened to the bottom of the frame member 11 and serves to support a coil 28 formed from a conductive material such as copper or the like. The coil 28 is positioned around the tube 23 and is aligned so that its axis extends along the axis of the tube 23. Due to the relative sizes of the tube 23 and the screws inserted therein by the pusher 20 this axis is the same as the axis of the screws when they are in the tube 23. It has been found that if the coil 28 is energized by a suitable source of alternating current the screws which are inserted in the tube 23 by the pusher 20 will be supported at the axial center of the coil 28 and at the radial center of both the coil 28 and the tube 23 without any additional supporting means. The positioning of the screws in the tube 23 by the field of the coil 28 is shown in FIGURE 5 wherein the magnetic flux generated by the coil 28 is also schematically illustrated.

A tool steel screwdriver blade 30 is positioned within the tube 23 and is guided for reciprocatory movement along the axis of the tube from the position shown in FIGURES 2 and 3 to the position shown in FIGURE 4. Suitable means (not shown) are provided for advancing the blade 30 along the axis of the guide tube 23 and for simultaneously rotating the blade 30 so that when the blade 30 is advanced through the tube 23 while a screw is supported in the tube 23 by the field of the coil 28 the blade 30 engages the screw, positions its tip in the slot of the screw and thereafter simultaneously rotates and axially moves the screw with respect to the tube 23. In addition to supporting the screws in the path of the blade 30 the field of the coil 28 serves to temporarily magnetize the tool steel screwdriver blade 30. Therefore, the screws are maintained in engagement with the blade even after they are moved out of the coil and into a tapped hole 33 in a workpiece 34 in the manner shown in FIGURE 4. Once the screws are seated in the tapped hole 33 the blade 30 is withdrawn to the position shown in FIGURE 2 and a new screw is inserted in the tube 23 by the pusher 20. The new screw is then supported in the path of the blade by the field of the coil 28 in the manner described.

By way of example, it has been found that steel screws having a 4/40 thread, having a length of .25", having a maximum outside diameter of slightly under .235" and having a weight of approximately ½ gram can be supported in a brass guide tube having an inside diameter and approximately .235" (but large enough to allow the screws to pass freely therethrough) and having an outside diameter of approximately .375", by a coil comprised of 5,400 turns of 38 gauge copper wire which is energized by ordinary 60 Hertz, 115 volt line current. Such a coil has a DC resistance of approximately 625 ohms and has an AC impedance of approximately 2,500 ohms. The exact nature of the phenomenon whereby the field of such a coil supports such a screw is not thoroughly understood but is believed to resemble the phenomenon of electromagnetic levitation. It differs from electromagnetic levitation in that only one coil is employed, in that the coil is energized with frequency and voltages not originally employed in levitation and in that the guide tube is present within the field of the magnet. It is believed that, although the field of the coil alternates at a rather low frequency, the alternating nature of the field causes a screw positioned within the field to tend to move in opposite directions which tendency is naturally slowed by inertia to such an extent that by the time any pronounced movement in one direction is undertaken the field has already been reversed thereby tending to cause the screw to move in the opposite direction.

Although only one embodiment of the invention is shown in the drawings and described in the foregoing specification it will be understood that the invention is not limited to that specific embodiment, but is capable of modification and rearrangement, and substitution of parts and elements without departing from the scope of the invention.

What is claimed is:

1. A fastener inserting device including:
   a hollow guide member having an axis and formed from a nonmagetic material;
   means for inserting fasteners formed from a magnetic material individually into the guide member;
   means for generating in the guide member an alternating magnetic field having an axis extending parallel to the axis of the guide member and of sufficient strength to support the fasteners inserted in the guide member by the inserting means;
   a fastener inserting tool mounted in the guide member, and
   means for moving the tool axially through the guide member into engagement with a fastener supported therein by the magnetic field and then for moving the tool and the fastener axially through the guide member.

2. The device according to claim 1 wherein the means for generating the magnetic field is a continuous coil of conductive material positioned around the guide member and energized by alternating electric current of predetermined voltage and frequency.

3. The device according to claim 1 wherein the tool is formed from a magnetic material having a predetermined minimum retentivity so that the fastener tends to cling to the tool by magnetic attraction after the moving means has moved the fastener out of the magnetic field.

4. In a fastener inserting device of the type including a fastener inserting tool, a guide sleeve for the tool formed from a nonmagnetic material, means for moving the tool axially along the sleeve and means for inserting fasteners formed from a magnetic material into the sleeve in the path of the tool, the combination with the sleeve of a coil of conductive material positioned around the sleeve and means for energizing the coil with alternating current of predetermined voltage and frequency to generate a magnetic field in the sleeve of sufficient strength to suspend in the path of the tool fasteners inserted in the tube by the inserting means.

5. The combination according to claim 4 wherein the fasteners are cylindrical and have a predetermined diameter and a predetermined length and wherein the sleeve has an inside diameter larger than the diameter of the fasteners and smaller than their length thereby allowing the fasteners to pass freely through the sleeve while preventing them from tipping.

6. The combination according to claim 4 wherein the tool is formed from a magnetic material so that the fasteners are attracted to the tool magnetically as the tool moves through the guide sleeve.

References Cited

UNITED STATES PATENTS

| | | | |
|---|---|---|---|
| 1,441,250 | 1/1923 | Smith | 144—32 |
| 2,686,864 | 8/1954 | Wroughton et al. | 219—7.5 |
| 3,187,238 | 6/1965 | Wilson et al. | 335—289 |
| 3,187,405 | 6/1965 | Rayburn | 144—32 |
| 3,311,259 | 3/1967 | Brown | 221—212 |

GERALD A. DOST, Primary Examiner

U.S. Cl. X.R.

221—212; 335—289